DIGITAL FREQUENCY DISCRIMINATOR

Filed June 19, 1967

WILLIAM J. REID
INVENTOR

BY

Mueller, Aichele & Rauner

United States Patent Office 3,501,701

Patented Mar. 17, 1970

3,501,701

DIGITAL FREQUENCY DISCRIMINATOR

William J. Reid, Scottsdale, Ariz., assignor, by mesne assignments, to the United States of America as represented by the Administrator of the National Aeronautics and Space Administration Filed June 19, 1967, Ser. No. 646,934
Int. Cl. H03b 3/04; H03k 9/06
U.S. Cl. 328—134 4 Claims

ABSTRACT OF THE DISCLOSURE

A digital logic discriminator having four integrated circuit chips each consisting of a shift register stage and interconnected to form a divide function, exclusive OR function, phase shifting and holding such that a single binary output signal is applied. When the binary signal is in a first state it indicates that one of the two input signals has a lower frequency than the other while in the second binary state the reverse is indicated.

BACKGROUND OF THE INVENTION

This invention relates to frequency discriminators and especially to those types which use digital logic circuits and supply a single binary output signal.

The application of frequency discriminators is quite well established. To date most frequency discriminators have been analogue in character, that is, the phase of the various signals is compared in strictly analogue manner with the output of the discriminator being an indication of the frequency difference. Some digital circuits have been constructed for comparing of frequencies of two input signals wherein the output is a set of signals which varies according to the difference to the frequencies. Such devices are called differential rate circuits. At any given instant there is no indication of whether one input frequency is greater than the other. However, the average of the output signals is indication of the difference frequency. In such circuits the output signal frequency varies as the phases of the input signals precess one with respect to the other. It is desired in certain applications that the different frequency be continuously indicated in a binary sense, i.e., whether one frequency is greater or lower than the other. In such situations the correction factor is the constant.

SUMMARY OF THE INVENTION

It is an object of this invention to provide a digital logic frequency discriminator having a binary output signal.

It is another object of this invention to provide a digital logic frequency discriminator in which the various component parts are constructed from identical integrated circuit chips.

Apparatus embodying the present invention includes five integrated circuit chips, each identical. Two of the chips are interconnected to form a phase shifter for shifting the relative phases between two received input signals, one with respect to the other. A second pair of integrated circuit chips provide phase detectors and gating setup which receives a phase shifted signal from the phase shifter and compares them. Output signals are supplied to a fifth integrated circuit chip which receives and holds the binary information indicative of which input signal frequency is the greater. In one embodiment of the present invention, each integrated circuit chip included three cross-coupled NOR circuits. Each integrated circuit chip stores information and is responsive to an input changing electrical state to alter the present storage state of the chip.

THE DRAWING

DESCRIPTION OF THE ILLUSTRATIVE EMBODIMENT

Figures 1, 2, 3:
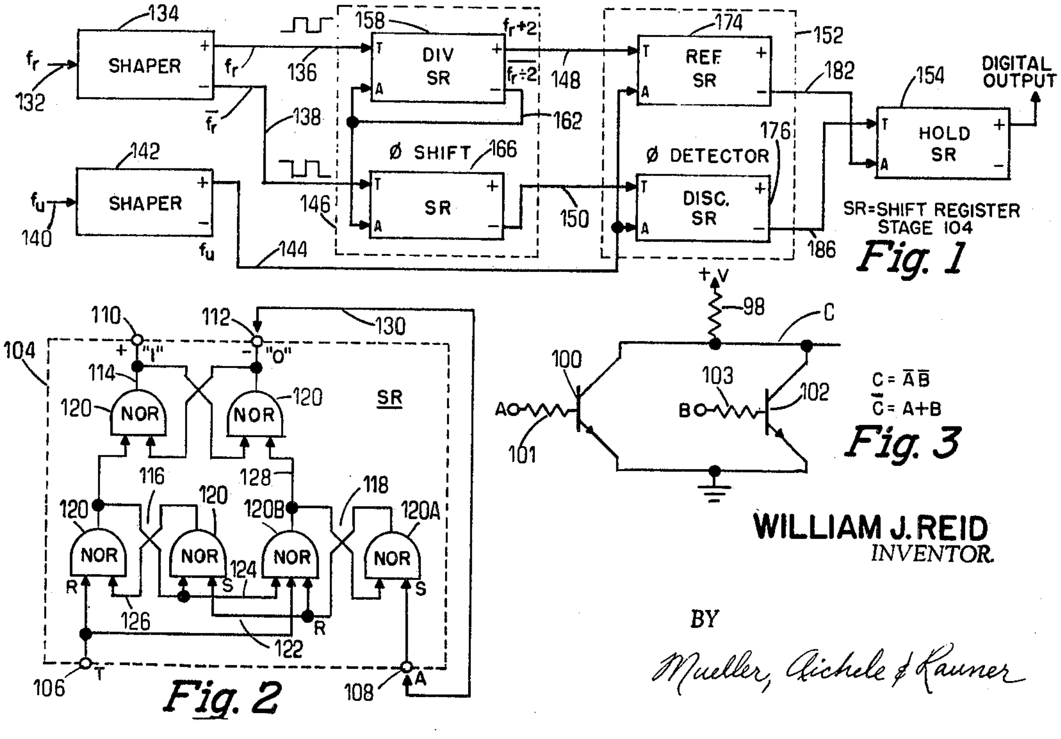
FIG. 1 is a schematic block diagram of the illustrative embodiment of the present invention.
FIG. 2 is the block schematic diagram showing the construction of each of the integrated circuit chips of the FIG. 1 embodiment.
FIG. 3 is a schematic diagram of a NOR circuit used in the construction of the FIG. 2 illustrated integrated circuit chip.

Before describing the FIG. 1 illustrative embodiment, the building blocks shown in FIGS. 2 and 3 will be first described. Referring particularly now to FIG. 3, there is illustrated a NOR circuit consisting of load resistor 98 having one end connected to a positive supply potential. The other end is connected to point or line C which is a common connection between the collectors of a plurality of transistors 100, 102, etc. The emitters of all the transistors may be grounded as shown. Therefore, all of the transistors are in parallel circuit between line C and ground reference potential. It is easily seen that when one of the transistors is conducting, i.e., presents a low impedance, the voltage at line C will be substantially ground reference potential, herein termed a "low potential." Therefore, when point C is at ground, it indicates that any one of the transistors is in a conductive state. To make line C at +V volts, herein termed "high potential," all of the transistors in parallel 100, 102, etc. must be nonconductive. This is termed an "AND" function. Looking at the inputs A and B which are supplied at the base electrodes of the transistors 100, 102, etc. through the base resistors 101 and 103, it is seen that both the input signals A and B must be at a relatively low potential for C to become high. This gives rise to the first equation. Note that there is an inversion in the signals from the base electrode to the line C. This gives rise to the terminology NOR which means "not-or." The second equation indicates the conditions for making line C low, which means that any one of the inputs A or B can be high. By definition, the binary signal when high indicates a binary 1 while when low indicates a binary 0. A zero is indicated by a bar over the alphabetic character.

Referring next to FIG. 2, there is illustrated a shift register stage, formed on one integrated circuit chip, used to construct the illustrated FIG. 1 digital logic frequency discriminator. The various NOR circuit elements shown in the shift register stage are constructed in accordance with the FIG. 3 illustrated NOR circuit. The functional characteristics of the shift register stage 104 are set forth below. When the input signal on terminal 106, hereinafter termed T, is high, the signal input to terminal 108, hereinafter termed A, is ineffective to alter the memory contents of the shift register stage. However, when signal T on terminal 106 shifts or switches from its high to its low condition or state, the present state of A (high or low) is stored in the shift-register stage and indicated by the output portion. The output portion includes terminal 110 which, when supplying a high voltage, indicates a binary one is stored in the stage, while the opposite stable state is indicated through second output terminal 112 carrying a high voltage, which indicates a binary zero is stored. Correspondingly, when a binary zero is stored in the shift register stage, the output potential on terminal 110 is low and when a binary one is stored the output potential on terminal 112 is low. The potentials on terminals 110 and 112 are always opposite. As such, the signals are termed "complementary." The shift register stage consists essentially of three flip-flop circuits, output flip-flop 114, reference flip-flop 116, and input flip-flop 118. Each flip-flop consists of two cross-coupled NOR circuits generally denoted 120. Such cross-coupling is well known in the art. Input signal T is supplied to reset input portions, generally designated by "R," to both flip-flops 116 and 118. Input signal A is supplied to the set input portion of flip-flop 118, generally denoted S. Flip-flop 116 also receives a set input over line 122 from the flip-flop 118. Correspondingly, an input to the reset side (R) of flip-flop 118 is provided over line 124 from flip-flop 116. The significance of these two connections will become apparent. Flip-flop 114 is controlled by signals over lines 126 and 128, respectively, from flip-flops 116 and 118.

The signal condition of shift register stage 104 is first described when terminal 106 has its input signal T high. Referring back to FIG. 1, it is seen that a high input signal causes a transistor 100, 102, etc. to be conductive and thereby provide a low output signal from the NOR circuit. Therefore, when T is high, lines 124 and 128 are low. Since both lines 124 and 128 are low, flip-flop 114 remains in its previous state continuing to store either a one or a zero.

When the signal T changes from a high to a low state, the high or low state of signal A then present at terminal 108 is stored in shift register stage 104 and provided as an output signal. We will first examine the circuit operation of flip-flop 118. When T is high, line 128 is low. When 128 is low, NOR circuit 120A supplies an inverted A signal to line 122, i.e., it acts as a gate. Signal A is inverted in flip-flop 116 and is supplied in its normal polarity; that is, when A is high, line 126 is high; correspondingly, when A is low, line 126 is low. When T returns to low, flip-flop 118 then assumes the state indicated by terminal 108 signal A. NOR circuit 120B has now been opened to pass the signals on lines 122 and 124. First, assume that A is low, then line 122 is high, closing NOR circuit 120B, making line 128 low. Therefore, flip-flop 118 assumes a state wherein line 128 is high and line 122 is low. Turning now to flip-flop 116, since line 122 is low, line 126 is also low forcing flip-flop 116 into a stable state represented by line 126 being high. Turning now to flip-flop 114, line 124 has momentarily gone high and line 128 is low. The high voltage on line 124 forces terminal 110 to be low, thereby forcing terminal 112 to be high. Therefore, a low input signal A, appearing when signal T changes from a high to low, results in a binary zero output signal. Correspondingly, a high signal A on terminal 108, when T changes from high to low, results in a momentary high signal being supplied to line 128 and a low signal to line 126. Flip-flop 114 is then set to supply a high signal on line 110 indicating a binary one with a correspondingly low signal on terminal 112.

The FIG. 2 circuit may be used to divide a number of serially applied pulses by two by connecting binary zero output terminal 112 to terminal 108, as by line or jumper 130. It will be remembered that the voltage on terminal 112, upon a transition from high to low of signal T, is opposite that of signal A found on terminal 108. For example, if signal A is high, then the resulting output signal on terminal 112 is low, and vice versa. Since the circuit is only operative when signal 106 goes from high to low, the terminal 112 changes every cycle of the input wave to provide an output wave one-half the frequency of the input wave.

Figure 4:
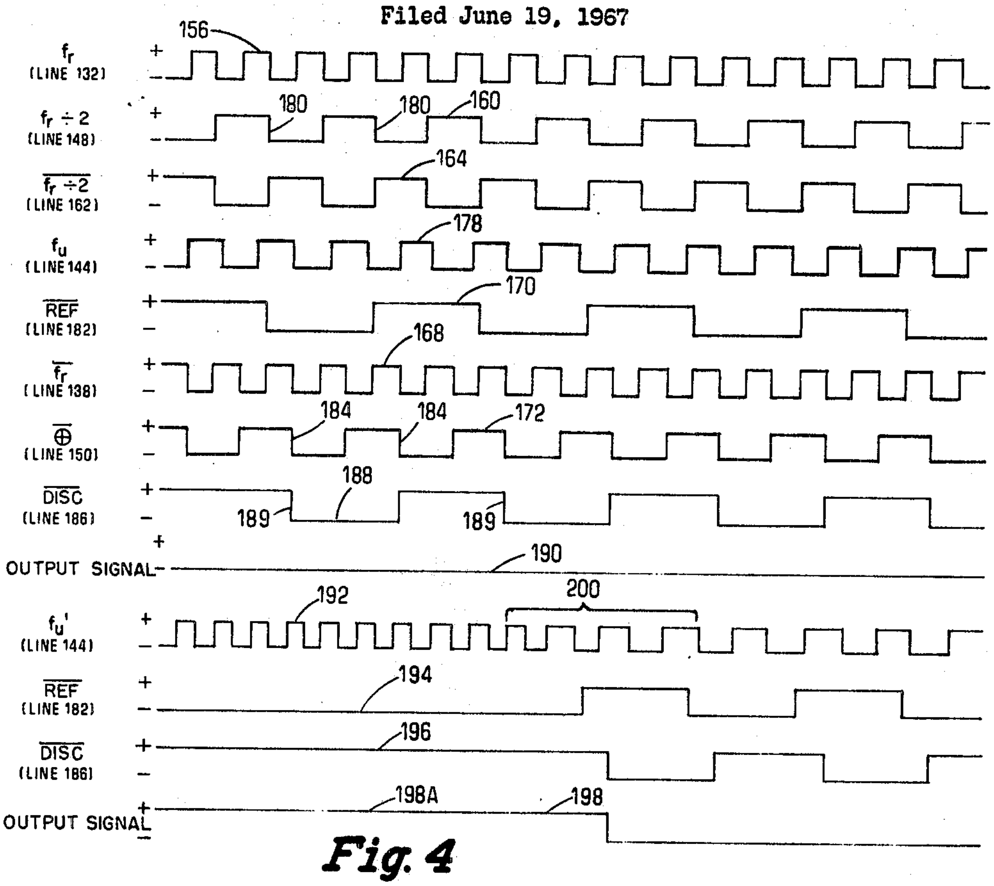
FIG. 4 is a set of idealized weight forms used to describe the operation of the FIG. 1 embodiment.

Referring now to FIGS. 1 and 4, there is described the illustrative digital logic frequency discriminator. This discriminator is characterized in that the output control signal for adjusting the frequency is digital in character, i.e., supplies a binary output signal. Also, an advantage of the described digital discriminator is its adaptation to the integrated circuit logic. For example, shift register stage 104 shown in FIG. 2 may be on one integrated circuit chip. The output signal being in a first state, indicates that a reference frequency $f_r$ is higher than an unknown frequency $f_u$; when in a second state the reverse is indicated.

Reference frequency $f_r$ is supplied over input line 132 from a reference oscillator (not shown). Shaper 134 forms pulses or rectangular waves from the input frequency and supplies in-phase output signals over line 136 and opposing-phase output signals over line 38. In a similar manner, a signal of unknown frequency is supplied over line 140. Shaper 142 shapes the received unknown frequency signal $f_u$, into rectangular waves and supplies the shaped pulses over line 144 for comparison with the reference frequency in the discriminator phase detector portion 152.

The discriminator consists of phase shifter 146 which receives the signals from shaper 134 for supplying two 90° phase-separated signals, respectively, over lines 148 and 150. The signals on line 148 are one-half the frequency of $f_r$ and are in-phase while the signals on line 150 are 90° shifted with respect to the signal on 148. Phase detector 152 receives the two phase-separated signals and compares them with signal $f_u$. The resultant comparison signals switch hold shift-register stage 154 such that its binary output signal is in a first stage whenever $f_u$ has a first relationship to $f_r$ and in a second binary state whenever $f_u$ has a second relationship to $f_r$. The operation is such that hold shift register stage 154 remains in the same binary state until the frequency relationship between $f_r$ and $f_u$ reverse. Such action provides a binary digital output indicating the relationship between $f_r$ and $f_u$.

The operation of the discriminator is best understood by referring to the idealized wave forms in FIG. 4 wherein rectangular waves 156 are found on line 136 at the T input of divide shift-reigster stage 158. Shift-register stage 158 is connected as shown in FIG. 4 with jumper 130 between the zero or negative (−) output portion and connected to the A input to provide a divide-by-two circuit. The line 148 supplied signal is wave 160, while the line 162 signal (the binary zero output of divide SR158) is wave 164. Wave 164 is supplied to the A input of shift register stage 166, while T input of that stage receives the binary-zero output signal of shaper 134 as supplied over line 138 and shown in FIG. 4 as rectangular wave 168. Since the divide shift register stage 158 and the shift register stage 166 are timed at their T inputs by waves from shaper 134 that are 180° out-of-phase and the frequency of signal 164 is one-half of the input signal, their respective output signals are 90° phase-shifted with respect to each other as shown by waves 170 and 172 of FIG. 4. The 90° phase relationship may be changed by connecting line 150 to the plus or binary one output portion of the register stage 166. Also, the divide shift-register stage 158 may be connected to line 148 through its binary zero output stage portion to provide an alternate connection.

Referring now to the phase detector 152, the in-phase wave 160 on line 148 is supplied to the timing input T of the reference shift-register stage 174. In a similar manner, the 90° phase-shifted signal on line 150 is supplied to the timing input T of the discriminator shift-register stage 176. The A signal inputs to the stages 174 and 176 both receive signal 168 from shaper 142 as supplied over line 144. One mode of operation represented by $f_u$ wave 178 in FIG. 4 has a frequency lower than that of the reference frequency $f_r$. The frequency difference is quite great in that $f_u$ is 25% lower than $f_r$. Each time wave 160 on line 148 changes from the high to the low, such as at transitions 180, the polarity of wave 178 representing $f_u$ is stored in reference shift register stage 174, with the opposite polarity being supplied over line 182 to the A input of hold shift register stage 154. Such action results in wave 170 being supplied to stage 154.

Shift register stage 176 receives wave 172, the binary zero output of the shift register stage 166, over line 150. It should be noted that wave 172 is 90° displaced from wave 160. Each time wave 172 goes from a high to a low, such as at transitions 184, the signal state of $f_u$ is transferred into shift register stage 176, inverted and supplied over line 186 to timing input T of shift-register stage 154. It should be noted in this particular illustration the output of shift register stage 176 is represented by wave 188, indicating that the hold shift register stage 154 is never switched from one state to the other. This holding is in accordance with the above teaching that as long as the frequency $f_u$ remains lower than the reference frequency $f_r$, the output signal of the shift register stage 154 remains a constant potential, indicated by line 190 in FIG. 4.

In order to illustrate a change in frequency and the reaction of the shift register stage 154 thereto, I have illustrated a variable frequency wave 192 which represents $f_u'$. With this latter wave, the output of the discriminator shift register stage 176 is wave 194. The output of the reference shift register stage 174 is represented by wave 196 and the output signal of shift register stage 154 is wave 198. It may be noted that the reference waves derived from the reference frequency $f_r$ are always the same. Therefore, waves 156, 160, 164, 168, and 172 are used to explain the operation of the discriminator with respect to varying frequency waves 192, 194, 196, and 198. Examination of the wave forms with respect to the discriminator block diagram will show the mode of operation as referred to below.

Wave 194 is derived from stage 174. Each time wave 160 has a high-to-low transition 180, the signal $f_u$ wave 192, on line 144, is sampled and stored in stage 174. Wave 194 is generated by stage 174 by supplying the inverse state of signal 192, $f_u'$, each transition of 180 of wave 160. Similarly, stage 176 supplies wave 196 over line 186, causing stage 154 to supply control signal 198. The first portion 198A indicates $f_u'$ has a higher frequency than $f_r$. During time 200 (FIG. 4), $f_u'$ undergoes a rapid decrease in frequency, from 33% high to 25% low in three cycles of $f_r$. The discriminator rapidly responds, switching states of control signal 198. The response of the discriminator to other changes in frequency is comparable.

When the reference frequency is equal to $f_u$, there is no change in the digital output signal. Only when the frequency relation of the two signals has reversed will the output signal switch states.

What is claimed is:

1. A frequency discriminator, including in combination, first and second input means each having pulse forming means responsive to an input signal, phase shifting means connected to said first input means for receiving the first input means signals and providing output signals which are shifted in phase approximately 90° with respect to each other and derived from the first input means signals, a phase detector connected to said phase shifter for receiving said phase shifted signals and comparing said phase shifted signals with an input signal from said second input means and providing a first set of control signals whenever said second input means signal frequency, and a second set of control signals whenever the first means input signal is higher than the second means input signal frequency, and holding means connected to said phase detector means and responsive to said first set of signals to provide a first binary output signal responsive to said second set of signals to provide a second binary output signal.

2. The combination as in claim 1 wherein said phase shifting means includes divide and exclusive OR shift register stage means each having two inputs and at least one output, one of which provides a signal complementary to the polarity of the signal received on one of said inputs and responsive to a change in signal on another one of said inputs to store and supply an output signal having a polarity complementary to a signal then present on said first-mentioned input, said another input on said divide stage being connected to said first pulse forming means and having a complementary output connected to said one input whereby the pulse repetitive frequency on said another input is divided by two, and further having an output providing a non-complementary signal with respect to the input signal on said one input, said exclusive OR stage having its one input connected to the complementary output of said divide stage and its said another input connected to said first pulse forming means such that the signal on said one input is stored, said stages providing a set of output control signals which are 90° out of phase with respect to each other, phase detecting means including a reference stage and a discriminating stage each characterized by having a timing input, a signal input, and a complementary output portion, the signal inputs of both phase detector stages being connected to said second pulse forming means and the respective timing inputs being respectively connected to said divide and exclusive-OR stages for receiving the 90° phase shifted pulses, and said holding means comprising a shift register stage having a timing input and a signal input with the timing input receiving signals from said discriminator stage and the signal input receiving signals from said reference stage, and having an output portion providing a digital signal indicative of the relationship of the pulse repetitive frequencies provided by said shapers.

3. A frequency discriminator employing logic switching circuits, including in combination, first input means respectively on first and second lines supplying a first set of complementary digital signals respectively on first and second lines and having a first repetitive frequency, second input means supplying digital signals having a second repetitive frequency, divide means including a flip-flop and connected to said first line and responsive to said first set of digital signals thereon to supply through said flip-flop a second set of complementary digital signals having a repetitive frequency one-half of the first set of repetitive frequency, exclusive OR means including a flip-flop and connected to said second line and to said divide means for receiving one of said second set of digital signals and responsive to supplied digital signals to supply through said flip-flop a digital signal having a repetitive frequency and phase-shifted with respect to said second set of digital signals, first bistable means connected to said divide means and to said second input means and responsive to a signal in said second set to selectively alter its stable state according to said second repetitive frequency signal, second bistable means connected to said exclusive OR means and to said second input means and being responsive to said phase-shifted signal to selectively alter its stable state according to said second repetitive frequency signal, and third bistable means connected to said first and second bistable means and responsive to an alteration in stable states of one of said bistable means to selectively alter its bistable state according to the then stable state of another one of said bistable means, and the stable state to which the third means is altered indicating which input means signal frequency is highest.

4. The combination as in claim 3 wherein said first and second means are responsive, respectively, to said second set digital signal and said phase-shifted digital signal only when such digital signals which have at least two signal states are shifting between said digital states in a first direction.

References Cited

UNITED STATES PATENTS 2,971,086 2/1961 Feijoo ------------- 328—133

DONALD D. FORRER, Primary Examiner

H. A. DIXON, Assistant Examiner

U.S. Cl. X.R.

307—215, 295